Figure 1:
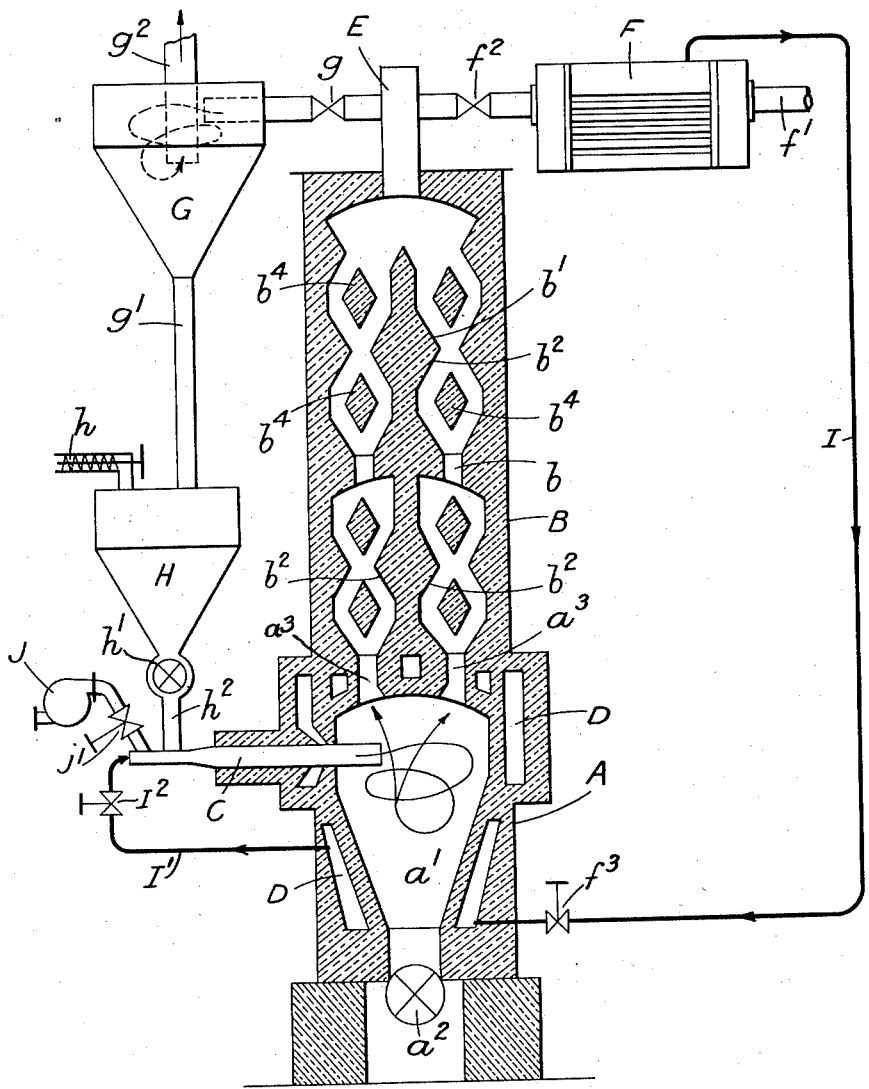

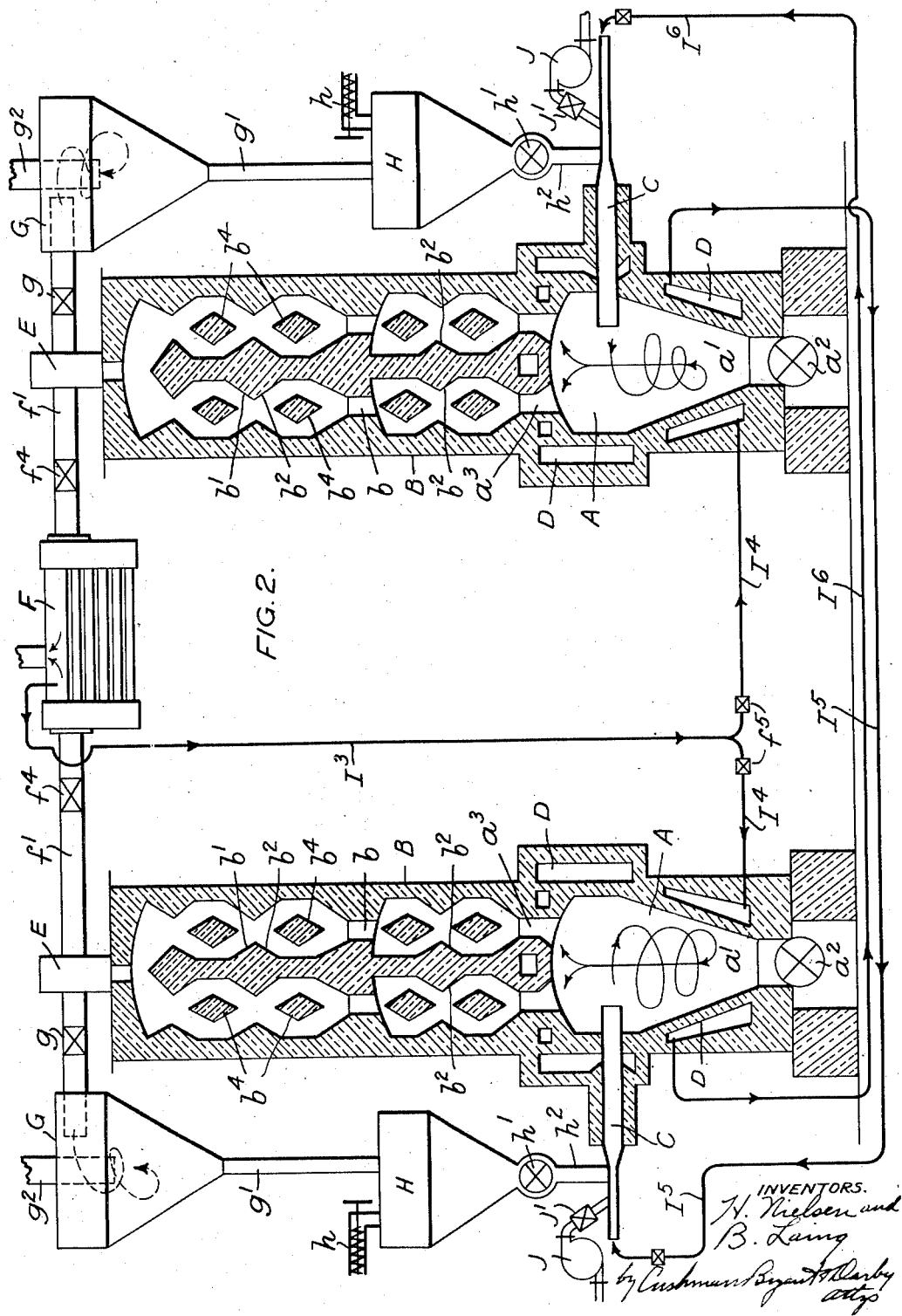

Patented June 25, 1929.

1,718,830

UNITED STATES PATENT OFFICE.

HARALD NIELSEN, OF BROMLEY, AND BRYAN LAING, OF PETTY FRANCE, ENGLAND, ASSIGNORS TO SENSIBLE HEAT DISTILLATION LIMITED, OF WESTMINSTER, ENGLAND, A BRITISH COMPANY.

APPARATUS FOR MANUFACTURING WATER GAS.

Application filed September 20, 1928, Serial No. 307,292, and in Great Britain May 28, 1927.

The invention relates to the manufacture of water gas and more particularly to the production of water gas from powdered or finely divided bituminous materials such as wood, peat, lignite, brown coal, black coal or the like, as well as from the carbonaceous residue which results from the distillation or carbonization of such materials either by external or internal heating.

In ordinary water gas production as carried out at present, the necessary heat required for the endothermic reaction: $C + H_2O = CO + H_2$, minus 2416 kilogram calories per kilogram of carbon, is obtained during the so-called blow period of water gas production when a certain amount of heat is stored in the fuel bed itself, but generally sufficient for a few minutes' water gas making only.

When dealing with or consuming a pulverulent or finely divided carbonaceous material, a very shallow fuel bed is required in order not to present too great a back pressure in the fuel bed itself; consequently, the amount of heat for reaction purposes which can be stored up in a fuel bed of such a nature is insignificant, a fact which has hitherto hindered the employment of such cheap materials for water gas production and the present invention has been evolved in order to overcome this objection.

According to the invention an auxiliary material, such as firebrick or other refractory material, is made use of in order to store up the heat which is required for the endothermic water gas reaction and during the period of water gas production the carbonaceous material together with the necessary volume of steam is brought into contact with the highly heated refractory material so that the heat required for the water gas reaction is given off by the refractories.

To this end a chamber, which forms the reaction chamber, and which contains a suitable arrangement of refractory material, is provided and is adapted to be heated to any desired temperature by the circulation therethrough of hot combustion gases or by the combustion therein of fuel and air, means being also provided, in cases where powdered fuel has been employed for heating up purposes, for substituting for the air a supply of steam (which is preferably superheated) when the refractory material has attained the required temperature to carry on the water gas reaction. By making the amount of firebrick or other refractory material large enough, sufficient heat may be stored up to promote the water gas reaction for any desired length of time; furthermore, it is possible to work within very close temperature limits so that the so-called lower water gas reaction, $C + 2H_2O = CO_2 + 2H_2$, can be entirely avoided, or, if desired, can be maintained to the exclusion of the higher water gas reaction, $C + H_2O = CO + H_2$.

In order that the said invention may be clearly understood and readily carried into effect the same will now be described more fully with reference to the accompanying drawing in which, Figure 1 shows in elevation, with parts in vertical section, more or less diagrammatically and by way of example a single water gas generator constructed according to one embodiment of the present invention, and Figure 2 is a view of the same character as Figure 1, showing two generators adapted to work alternately.

Referring to Figure 1, A is a combustion chamber composed of or lined with refractory material, the lower part $a'$ of which is conical and provided at its lower end with a rotary valve $a^2$ for the removal of ash. B is the reaction or water gas generating chamber which is superimposed upon the combustion chamber A and which is also composed of or lined with refractory material. The reaction chamber B is separated from the combustion chamber A by a web or constriction formed with openings $a^3$. A web $b'$ is also provided centrally of the reaction chamber B and forms a constriction between the upper and lower parts of the said chamber. The said web $b'$ is provided with bosses or protuberances $b^2$, which in the example shown are approximately diamond-shaped in cross-section. Extending across the water gas generating chamber are a number of webs $b^4$ which are also diamond-shaped in cross-section. The inner circumferential wall of the water gas generating chamber B is also provided with bosses or protuberances disposed as shown relatively to the transverse webs $b^4$. Owing to this arrangement it will be clear that a number of vertical passages are provided in the reaction chamber which, although compelling the products of combustion and also the steam and powdered fuel from the combustion chamber A to pursue a sinuous path in passing therethrough, permit any ash or unconsumed carbon to fall by gravity back into the combustion chamber A. The combustion chamber A is provided with a tangentially arranged burner C adapted, in the example shown, for the combustion of powdered fuel and air, and, surrounding the combustion chamber A is a series of passages D, D, for the circulation therethrough of the supply of steam so as to superheat the same before it is supplied to the burner C. E is a pipe for leading off the products of combustion or the water gas either to a low pressure boiler F or to a cyclone separator G, the products of combustion after passing through the tubes of the low pressure boiler being removed through a pipe $f'$. H is a fuel hopper to which powdered material is fed by means of a feed screw $h$, the lower part of the fuel hopper being of conical configuration and provided with a rotary coal valve $h'$ for supplying fuel as and when required from the fuel hopper through a pipe $h^2$ to the burner C. I is a pipe for conveying steam from the boiler F to the space D surrounding the combustion chamber. $f^2$ is a valve for cutting off the branch pipe leading to the boiler F and $f^3$ is a valve for controlling the amount of steam allowed to pass from the pipe I to the passage D around the combustion chamber. $g$ is a valve for controlling the flow of water gas to the cyclone separator G. $I'$ is a pipe for conducting superheated steam from the passages surrounding the combustion chamber A to the burner and $I^2$ is a valve for regulating the amount of steam supplied to the burner. J is a fan for supplying air under the control of a valve $J'$ to the burner C.

Instead of a simple tube C as shown, one or more powdered fuel burners may be provided of the type which is adapted to impart a whirling movement to the powdered fuel and air, and means may be provided for supplying secondary air enveloping the primary air and fuel, a whirling movement being also adapted to be imparted, if desired, to such secondary air.

In operation air and powdered fuel are admitted tangentially to the combustion chamber A by the burner C, the products of combustion passing through the reaction chamber B and heating up to a very high temperature the refractory material contained therein.

The fact that actual combustion takes place in the combustion chamber and that the combustion gases pass from the combustion chamber A into the reaction chamber B, prevents, or tends to prevent, overheating or melting of the refractory material in the chamber B; overheating of the chamber A itself being prevented by reason of the steam which circulates in the passages surrounding the same.

The waste combustion gases pass through the pipe E and the valve $f^2$, which at such times is open, to the boiler F and thence through the pipe $f'$ to a chimney or stack. After the water gas generating chamber B has been heated up to the temperature which is requisite for the water gas reaction the supply of air is turned off. The valve $f^3$ is opened so as to supply steam from the boiler F (which steam has been generated partly or entirely by the heat of the combustion gases) to the superheater D surrounding the combustion chamber A. The valve $f^2$ is also closed and the valve $g$ is opened. On operating the valve $I^2$ and closing the valve $J'$ steam will be supplied in lieu of air to the chamber A and such steam, together with the powdered fuel constitute the constituents which react to produce the ordinary water gas reaction. As the powdered fuel and steam pass through the highly heated water gas generating chamber B, water gas is generated, and such gas passes into the cyclone separator G and is withdrawn to a suitable reservoir through the conduit $g^2$. Any unconsumed carbon passes through the pipe $g'$ back to the fuel hopper H. After the water gas reaction has been in operation for a certain period of time the refractories in the water gas generating chamber will be cooled down and thereupon the supply of steam is cut off by closing the valves $I^2$ and $f^3$. The valve $g$ is closed, the valve $f^2$ is opened and the valve $J'$ is again opened so that air instead of steam passes to the burner C. The air and fuel are again ignited in the combustion chamber so that the refractories within the chamber B are again heated up and the process of water gas manufacture is carried on intermittently in this manner.

Arrangements may be made so that only a controlled part of the total air required for the complete combustion of the carbon enters at the burner, while the rest of the air may enter the chamber A or B further up at some convenient place in order to secure an even temperature throughout the refractories. The ash is removed from time to time from the conical hopper below the combustion chamber in any well known manner.

Water gas generated by the process described may be utilized as desired, but a specially advantageous application is in the distillation of bituminous materials for the production of enriched gas for city use. In such a case the water gas may be allowed to leave the generator at such a temperature as to be directly utilizable for distillation purposes, and if permitted to mix with the gases produced by the distillation process, a product highly suitable for city gas requirements results.

In order to obtain a steady, regular supply of water gas two or more complete generators may be combined so as to work either alternately or in sequence.

Referring to Figure 2, where the same reference letters have been employed as in Figure 1 to denote the same or corresponding parts, and where two generators are provided adapted to work alternately, the hot gases from the generator which is being heated up pass to the boiler F through either of the controlling valves $f^4, f^4$. Steam from the boiler F passes through the pipe line $I^3$ and through the controlling valves $f^5, f^5$, to either of the branch pipe lines $I^4, I^4$, to one or other of the generators, and, after circulating around the passages in the combustion chamber and/or water gas generating chamber of the generator that is being heated up so that it is highly superheated and at the same time prevent superheating of the combustion chamber, the superheated steam passes through one or other of the branch pipes $I^5, I^6$, to the burner C of the generator within which gas manufacture is being carried on.

We have found that carbonized residues, resulting from the distillation or carbonization of the above mentioned raw materials obtained by the employment of internal heating means in rotary retorts, are particularly suitable for water gas production by means of the above described method and apparatus, although we do not limit ourselves to the use of these. It is also desirable that the volatile matter present in the carbonized residue should be as low as possible in order that very little or no methane is present in the subsequent water gas produced. In employing such materials a means is afforded of using the small breeze which has been sifted from fuel of larger size and which would be useless for domestic and many other purposes.

The process and apparatus forming the subject of the present invention can also be employed for producing a gas mixture consisting of 25% nitrogen and 75% hydrogen for use in cases where the gas mixture is to be employed for the manufacture of synthetic ammonia. In such cases, and instead of cutting off the supply of air when steam is admitted to the reaction chamber, a certain amount of air is also admitted with the steam which reacts with a portion of the powdered fuel, thus producing carbon dioxide and setting the nitrogen free. Thereafter the reaction gases may be passed into a separate chamber, distinct from the water gas generating chamber shown, such as a checkerwork chamber, which may contain a catalyst, in the presence of which the steam oxidizes the carbon monoxide to carbon dioxide thus setting free another volume of hydrogen. The proportions of the gaseous mixture are so controlled that after the absorption of carbon dioxide from the gases by any of the usual well known methods a gas mixture is produced consisting essentially of 25% nitrogen and 75% hydrogen. After cleansing and purifying the gaseous mixture it may be passed to an ammonia plant of any suitable type.

We claim:

1. Apparatus for manufacturing water gas, comprising a water gas generating chamber, refractory material in said chamber providing a plurality of channels extending vertically therethrough, a combustion chamber situated beneath said water gas generating chamber, whereby the products of combustion from the combustion chamber will pass upward through the channels formed by the refractory material in the water gas generating chamber and come into contact with and highly heat said refractory material, a water gas outlet at the top of said water gas generating chamber, means for cutting-off the flow of combustion gases through said water gas generating chamber, means for passing finely divided solid carbonaceous materials and steam upwardly through the channels formed by the highly heated refractory material in the water gas generating chamber for the purpose of manufacturing water gas, and means for removing ash which falls downwardly through said refractory material to the base of the combustion chamber.

2. Apparatus for manufacturing water gas comprising a water gas generating chamber, refractory material in said chamber providing a plurality of channels extending therethrough, a combustion chamber situated beneath the water gas generating chamber, so that the products of combustion will pass into the combustion chamber in contact water gas generating chamber in contact with and highly heat the said refractory material, a water gas outlet at the top of said water gas generating chamber, means for cutting-off the flow of combustion gases through said water gas generating chamber, means for passing finely divided solid carbonaceous materials and steam upwardly through the said channels in highly heated refractory material in said water gas generating chamber for the purpose of manufacturing water gas, means for removing ash which falls downwardly through said refractory material to the base of the combustion chamber, and a passage surrounding the combustion chamber for superheating the steam supplied to said water gas generating chamber.

3. Apparatus for manufacturing water gas, comprising a water gas generating chamber, refractory material in said water gas generating chamber providing a plurality of channels extending therethrough, a combustion chamber, an outlet from said water gas generating chamber, means for conducting the products of combustion from the combustion chamber through the channels formed by the refractory material in the water gas generating chamber and highly heat said refractory material, means for cutting-off the flow of combustion gases through the water gas generating chamber, a valve controlled water gas outlet at the top of the water gas generating chamber, and means for passing finely divided carbonaceous materials and steam upwardly through the highly heated refractory material in said water gas generating chamber to said water gas outlet.

4. Apparatus for manufacturing water gas comprising a plurality of water gas generating chambers, refractory material in each of said chambers, arranged to form a plurality of channels therein, a combustion chamber associated with each water gas generating chamber in such a manner that the products of combustion flow through the last said chambers and come into contact with and highly heat the refractory material therein, means for separately controlling the flow of combustion gases through the channels formed by the refractory material in each of said water gas generating chambers, a water gas outlet at the top of each of said water gas generating chambers, means for passing finely divided solid carbonaceous material and superheated steam upwardly through the channels formed by the refractory material in each of said water gas generating chambers after the same has been highly heated for the purpose of manufacturing water gas, means for circulating steam around one of the combustion chambers during the period when the refractory material in the associated water gas generating chamber is being heated up, and means for conducting the superheated steam from the superheating passage about the combustion chamber to another of the water gas generating chambers wherein water gas is being manufactured.

5. Apparatus for manufacturing water gas comprising a water gas generating chamber, refractory material in said chamber, forming vertically disposed channels whose walls are corrugated so that combustion gases and steam and powdered fuel are caused to pursue a sinuous path in passing through the chamber, while allowing the ash to fall by gravity downward through said channels, a combustion chamber situated beneath the water gas generating chamber, whereby products of combustion will come into contact with and highly heat said refractory material, a water gas outlet at the top of the water gas generating chamber, means for cutting-off the flow of combustion gases through the channels formed by the refractory material in the water gas generating chamber, means for injecting finely divided solid carbonaceous materials and steam upwardly through the channels formed by the highly heated refractory material in the water gas generating chamber for the purpose of manufacturing water gas, and means for removing ash which falls downwardly through said channels to the combustion chamber.

In testimony whereof we have affixed our signatures.

HARALD NIELSEN.
BRYAN LAING.